United States Patent
Hu et al.

(10) Patent No.: US 7,533,706 B2
(45) Date of Patent: May 19, 2009

(54) GREEN TIRE BEAD

(75) Inventors: Benfei Hu, Hanford, CA (US); Stanley T. Esposito, Hanford, CA (US); Ronald E. Evans, Hanford, CA (US)

(73) Assignee: Pirelli Tire LLC, Hanford, CA (US)

( * ) Notice: Subject to any disclaimer, the term of this patent is extended or adjusted under 35 U.S.C. 154(b) by 107 days.

(21) Appl. No.: 10/152,125

(22) Filed: May 21, 2002

(65) Prior Publication Data

US 2002/0187313 A1    Dec. 12, 2002

Related U.S. Application Data

(62) Division of application No. 09/433,852, filed on Nov. 4, 1999, now Pat. No. 6,447,905.

(60) Provisional application No. 60/116,357, filed on Jan. 19, 1999.

(51) Int. Cl.
B60C 1/00 (2006.01)
B60C 15/04 (2006.01)
B60C 15/00 (2006.01)
B29D 30/48 (2006.01)

(52) U.S. Cl. ............... 152/540; 152/547; 156/136; 526/336

(58) Field of Classification Search ........ 152/540, 152/547; 156/136; 526/336
See application file for complete search history.

(56) References Cited

U.S. PATENT DOCUMENTS

| | | | |
|---|---|---|---|
| 1,914,040 A | 6/1933 | Pierce | |
| 2,847,406 A | * 8/1958 | Legge | 526/336 X |
| 3,715,266 A | 2/1973 | Winters et al. | |
| 3,798,190 A | 3/1974 | Yoshimoto et al. | |
| 4,202,717 A | 5/1980 | Seiberling | |
| 4,320,791 A | 3/1982 | Fujii et al. | |
| 4,540,744 A | 9/1985 | Oshima et al. | |
| 4,575,534 A | 3/1986 | Oshima et al. | |
| 4,790,365 A | 12/1988 | Sandstrom et al. | |
| 5,098,941 A | 3/1992 | Tsuriya | |
| 5,162,409 A | 11/1992 | Mroczkowski | |
| 5,176,767 A | 1/1993 | Hoshino et al. | |
| 5,176,957 A | 1/1993 | Hoshino et al. | |
| 5,219,944 A | 6/1993 | Schriver et al. | |

(Continued)

FOREIGN PATENT DOCUMENTS

EP    0 066 225 A    12/1982

(Continued)

OTHER PUBLICATIONS

English machine translation of EP 0 066 225 A2.*

(Continued)

*Primary Examiner*—Adrienne C Johnstone
(74) *Attorney, Agent, or Firm*—St. Onge Steward Johnston & Reens LLC

(57) ABSTRACT

Tire bead rubber compositions and tire beads made therewith are provided having good dimensional stability, processability and wire adhesion Tire bead rubber compositions containing crosslinked styrene butadiene rubber are also provided having good dimensional stability, processability and wire adhesion. Methods for manufacturing tire beads and tires using dimensionally stale compositions are further provided.

9 Claims, 4 Drawing Sheets

U.S. PATENT DOCUMENTS

| | | | |
|---|---|---|---|
| 5,283,289 A | | 2/1994 | Yamamoto et al. |
| 5,529,106 A | | 6/1996 | Yamamoto |
| 5,594,052 A | | 1/1997 | D'Sidocky et al. |
| 5,660,656 A | | 8/1997 | Herbelleauu et al. |
| 5,997,673 A | * | 12/1999 | Sandstrom et al. ...... 152/547 X |
| 6,127,488 A | | 10/2000 | Obrecht et al. |

FOREIGN PATENT DOCUMENTS

| | | |
|---|---|---|
| EP | 514910 | 11/1992 |
| EP | 0 854 170 A | 7/1998 |
| EP | 0 900 826 | 10/1999 |
| FR | 2235008 | 1/1975 |
| GB | 1078400 | 8/1967 |
| GB | 1576424 | 10/1980 |
| IT | 1438441 | 6/1976 |

OTHER PUBLICATIONS

Rubber Technology and Manufacture, ed. C. M. Blow, published for the Institution of the Rubber Industry by Newnes-Butterworths, London, 1975, pp. 3-5 and 93-96.*

Walter E. Burton, "The Story of Tire Beads and Tire"; 1954 McGraw Hill Book Company, Inc., New York; pp. 85, 90-93.

John W. Livingston and John T. Cox, Jr., "The Manufacturing of GR-S", Chapter 7, Copyright 1954, John Wiley & Sons, Inc., New York; pp. 175, 122.

Samuel K. Clark, "Mechanics of Pneumatic Tires", 1.1.1. Introduction & 1.1.3 "Technical Evaluation of Physical Properties of Tire Compounds", Aug. 1981; US Dept. of Transportation, National Highway Traffic Safety Administration, Washington, DC.

Hahn GmbH, "Aramid Beads for Pneumatic Tires".

R.T. Vanderbilt Company, Inc. Handbook, "The Vanderbilt Rubber Handbook" Thirteen Edition 1990, pp. 784-791,806-821.

European Search Report, Aug. 17, 2005 (3 pages).

\* cited by examiner

GREEN TIRE BEAD

PRIOR APPLICATION

This application is a Divisional of Ser. No. 09/433,852 filed Nov. 4, 1999, now issued as U.S. Pat. No. 6,447,905, which claims the benefit of U.S. Provisional Application No. 60/116,357 filed Jan. 19, 1999.

FIELD OF THE INVENTION

This invention relates to bead insulation compositions, tire beads, methods of making tire beads, and also to methods of making tires.

BACKGROUND OF THE INVENTION

Maintaining the shape and overall dimensions of the tire bead is critical for assembly and manufacture of high quality tires, however, conventional tire beads typically distort or deform during tire assembly and curing. Conventional bead insulation compositions typically have good bead wire adhesion and processability but do not maintain their shape and overall dimensions (i.e., geometry) in an uncured or green state. "Processability" is a term understood by those skilled in the art, and is typically indicated by scorch resistance, viscosity and the ability of the rubber composition to be used in bead forming equipment known to those skilled in the art.

Numerous solutions have been adopted by those skilled in the art in an attempt to overcome the problem of distortion and deformation of the shape and overall dimensions of conventional tire beads during tire manufacturing, yet each has associated disadvantages. One solution has been to precure the green tire beads so as to provide a tire bead which will maintain its bead geometry during tire manufacturing. Conventional tire beads are typically precured in an autoclave at 285° F. for 11 minutes. A disadvantage of precuring is that it raises manufacturing costs by adding an additional manufacturing step, raising energy costs and lowering tire bead manufacturing yields.

Two additional solutions, which also involve preprocessing steps, have been to wrap or staple tire beads. Wrapping the beads requires significant manpower and time, and, accordingly, significantly raises manufacturing costs. The disadvantages of stapling the bead are that special automatic equipment is required involving significant capital, increased operational complexity, lowered process yields, and, accordingly, also increased manufacturing times.

Tire manufacturing involves forcing two tire beads over the ends of a tire carcass. The tire carcass and conventional tire bead is then assembled with other tire components, such as the tread and side wall components, and then vulcanized. The tire bead must have dimensional integrity such that the tire bead can be placed over the tire carcass, and turned thereover, without distorting or deforming the tire bead.

U.S. Pat. No. 4,575,534 to Oshima et al., Pat. No. 4,540,744 to Oshima et al., Pat. No. 5,283,289 to Yamamoto et al., Pat. No. 5,098,941 to Tsuriya, and Pat. No. 3,715,266 to Winters et al. disclose conventional tire rubber compositions which contain uncrosslinked styrene butadiene rubber. In particular, the '744 patent to Oshima discloses a tire rubber composition containing a butadiene polymer with a branched polymer through a tin-carbon bond and a styrene butadiene rubber. The '289 patent to Yamamoto et al. discloses a fiber reinforced styrene butadiene containing rubber composition. The '941 patent to Tsuriya discloses a phenolic resin reinforced bead filler composition having a low amount of hexamine which reduces the amount of deterioration of the tire carcass. The '266 patent to Winters et al. discloses adding an adhesion component to conventional uncrosslinked styrene butadiene to improve the adhesion between the bead wire and the bead insulation composition. A disadvantage of these conventional tire rubber compositions is that they typically must be precured, cloth wrapped or stapled to maintain dimensional stability when used in making tire beads.

What is desired, therefore, is a bead insulation composition and tire bead that is dimensionally stable and that does not have to be preprocessed, but which provides sufficient bead wire adhesion and processability. Also desired is a method of manufacturing a tire using a dimensionally stable tire bead which exhibits sufficient bead wire adhesion and processability but which is not preprocessed, and a method of making a tire bead using a dimensionally stable bead insulation composition.

SUMMARY OF THE INVENTION

Accordingly, it is an object of the invention to provide a tire bead which does not have to be precured or cloth-wrapped or stapled before assembly into a tire.

Another object of the invention is to provide a tire bead insulation composition which has good adhesion to the tire bead wire, good processability, and which is dimensionally stable and does not require preprocessing.

Yet another object of the invention is to provide a method for manufacturing a tire bead utilizing a bead insulation composition having good bead wire adhesion and processability, yet which does not require preprocessing.

Still another object of the invention is to provide a method of manufacturing a tire using a tire bead that is not preprocessed yet which has good dimensional stability.

These and other objectives are achieved by the invention which provides a dimensionally stable ring for use as a tire bead, a tire bead, a tire bead rubber composition, a method of making a tire bead, and a method of making a tire. In another aspect, the objects are achieved by the invention which provides: a tape formed from a plurality of bead wires encapsulated and adhered by a dimensionally stable green rubber composition; a bead wire and a rubber composition containing a styrene butadiene rubber having crosslinked styrene butadiene and at least one other diene rubber; a styrene butadiene rubber having crosslinked styrene butadiene and at least one other diene rubber; adding a dimensionally stable green rubber composition to a plurality of bead wires to form a tape thereby encapsulating and adhering the bead wires; forming a dimensionally stable green tire bead comprising the step of adding a dimensionally stable green rubber composition to a plurality of bead wires to form a tape thereby encapsulating and adhering the bead wires, assembling the green tire bead with the tire carcass and other tire components and vulcanizing the tire assembly.

The invention and its particular features will become more apparent from the following detailed description considered with reference to the accompanying figures.

DETAILED DESCRIPTION OF DRAWINGS

Figure 1:
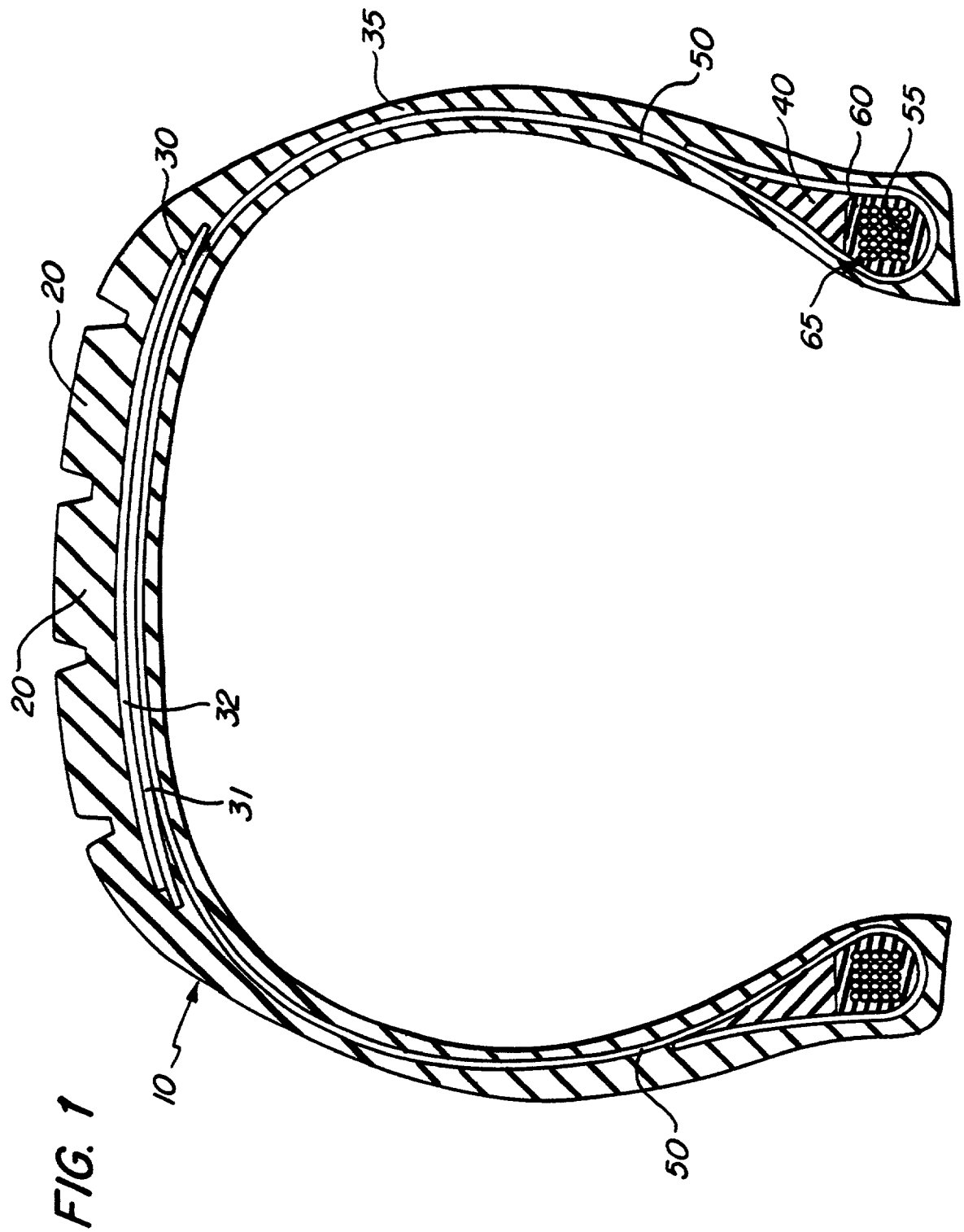
FIG. 1 is a cross-section of a tire.

A new bead insulation composition 60 has been developed for use in tires 10 for passenger and commercial vehicles, such as trucks and automobiles. FIG. 1 depicts a cross-sectional view of a tire 10, which employs the tire bead 65 containing the bead rubber composition 60 in accordance with this disclosure. The bead rubber composition 60 disclosed enables the manufacture of tire beads 65 which maintain bead 65 geometry (i.e., are dimensionally stable) without precuring or wrapping with cloth or stapling. The preferred bead composition 60, however, has good dimensional stability, bead wire adhesion and processability. "Dimensionally stable rubber" means a rubber which is essentially resistant to flow, as indicated by 100% modulus of the green rubber composition, and generally ranges from about 100 psi at standard test conditions (see Example 3 below for standard green strength test conditions) and Spider Mold Flow between from about 0% to about 10% tested at standard conditions of a 151° C. cure temperature, 673.85 psi for 14 minutes.

In the practice of the invention, a synergistic composition containing a crosslinked styrene butadiene in an amount ranging from about 10 to about 70 parts, and preferably from about 20 to about 40 parts, per hundred parts rubber and at least one other diene rubber, such as uncrosslinked styrene butadiene rubber, butadiene rubber, vinyl-styrene butadiene rubber, vinyl-butadiene rubber, natural rubber and synthetic rubber. The disclosed composition also contains fillers and processing aids known to those skilled in the art which are compounded with the rubber to make the bead rubber composition disclosed. Other diene rubbers useful for the invention are disclosed in U.S. Pat. Nos. 5,219,944 to Scriver et al., and 5,162,409 to Mroczkowski and are hereby incorporated by reference.

Fillers and other processing aids, include reinforcing materials, processing agents, antioxidants, antiozonants, vulcanization activators, vulcanization accelerators, tackifiers for increasing the green tack of the rubber, vulcanization agents and scorch retarders, known to those skilled in the art. Reinforcing materials include N326, N660 and other grades of carbon black. Processing agents include oil. Antioxidants include wax or TMQ (polymerized 1,2-dihydro-2,2,4-trimethylquinoline). Antiozonants include 6PPD (N-(1,3-dimethylbutyl)-N'-phenylenediamine). Zinc oxide is typically used as a vulcanization activator. Tallow fatty acid and stearic acid are typically used as activators with zinc oxide. DCBS (N,N'-dicyclohexyl-2-benzothiazolesulfenamide), TBBS (N-tert-butyl-2-benzothiazolesulfenemide), MBTS (2,2'-Dithiobis-benzothiazole), and MBT (Mercaptobenzothiazole) are typically used as accelerators. Vulcanizing agents include insoluble sulfur, including sulfur treated with 20% oil, such as CRYSTEX®-OT-20 available from Flexsys Corporation, and soluble sulfur. Scorch retarders include N-(cyclohexylthio) phthalimide.

The tire 10 of FIG. 1 includes a carcass 50 comprised of textile cords or other cords disposed according to the radial extension which is folded back from the inside to the outside around the tire bead 65 and a bead filling strip 40. Other tire components include a belt 30 and cords 31 and 32, tire tread 20. The bead 65 includes bead wire 55 and the bead insulation composition 60. The bead wire 55 is typically steel but can be any other suitable material, including a synthetic material, such as an aramid. See for example, 1997 *Tire Technology International*.

Figure 2:
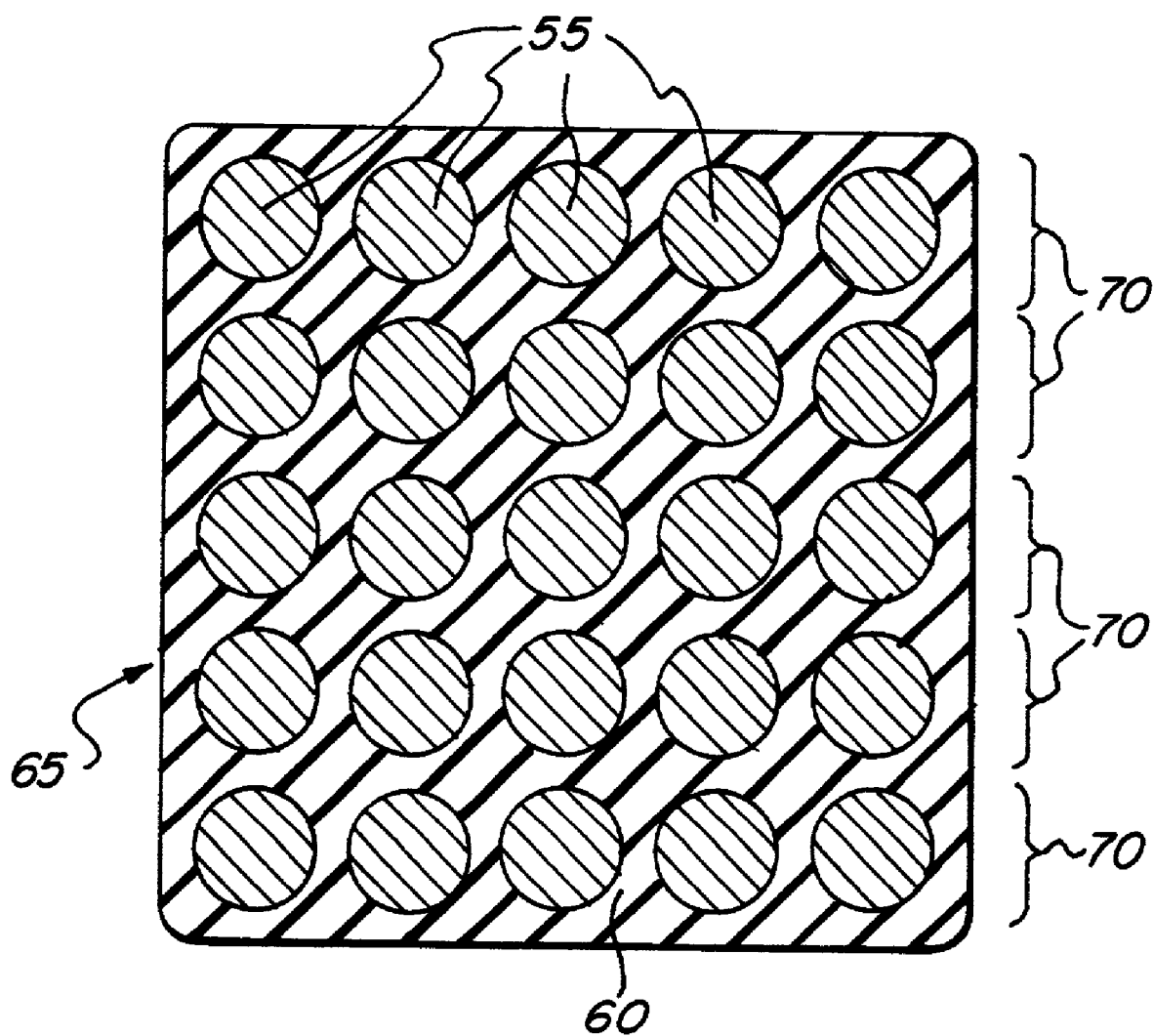
FIG. 2 is an exploded view of a tire bead as shown in FIG. 1.

FIG. 2 shows an exploded view of the tire bead 65 cross-section shown in FIG. 1 comprising the bead rubber composition 60 and bead wires 55. The tire bead 65 is comprised of a tape 70 formed from a plurality of wires 55 encapsulated and adhered by rubber composition 60 disposed directly on top of one another forming a ring from a plurality of layers of tape 70 adhered by the rubber composition 60. Tape 70 comprises a plurality of bead wires 55 arranged side by side and, preferably, in parallel to one another. As shown in FIGS. 1 and 2, the number of bead wires 55 and the number of layers of tape 70 may be the same, but this is not necessary, or the cross-sectional shape of the bead 65 may preferably be square. It is understood, however, that the shape of the bead 65 cross-section can be square, round, triangular, flat or any other shape, and that any number of bead wires 55 and layers of tape 70 may be used, depending upon the type of tire 10 in which the bead 65 is used.

Tire beads 65 made using the inventive bead rubber composition 60 typically exhibit bead wire adhesion between about 70 and about 300 $lb_f$, but which is at least greater than 70 $lb_f$, and more preferably is greater than 120 $lb_f$ and more preferable greater than 150 $lb_f$. It can further be seen that selection of the cure package ingredients in combination with the tire bead rubber compositions 60 disclosed herein further increases bead wire adhesion while maintaining dimensional stability and processability. "Cure package ingredients" means vulcanization agents and accelerators, such as combinations of insoluble sulfur, Crystex® OT-20, DCBS, and/or TBBS in various proportions. See, Examples 1, 8 and 9.

To make bead rubber composition 60, bead rubber composition 60 is compounded in accordance with the skill in the art and the examples provided in this disclosure. To make the tire bead 65, a tape 70 including a plurality of bead wires 55 arranged parallel to one another is extruded with bead rubber composition 60 which encapsulates and adheres the bead wires 55, forming a dimensionally stable ring from the tape 70 which adheres to itself by green rubber composition 60. Tire bead 65 is preferably made using bead forming equipment known to those skilled in the art, such as those having an extruder, die and takeup or winding machines. Other methods for making tire beads 65 or rings known to those skilled in the art may be used, such as coating the wire 55 with rubber composition 60, and those disclosed in U.S. Pat. No. 5,176,957 to Hoshino et al., and are hereby incorporated herein by reference. Tape 70 is wound into a ring using a winding or takeup machine so that the tape 70 is wound directly on top of itself, until the desired number of layers of tape 70 are achieved and a dimensionally stable bead 65 is so formed. The adhesion or tack of the green bead insulation composition 60 holds the layers together. The tire 10 is assembled by forcing the dimensionally stable bead 65 over each end of a tire carcass 50, and the other tire components are assembled therewith. The other tire components are known to those with skill in the art, and include the side wall 35, tread package 20, 30, 31 and 32. The tire assembly 10 is then vulcanized.

The number of layers of tape 70 in a cross-section of a tire bead 65 in accordance with this disclosure can be from 4 to 40. The number of bead wires 55 in the layer of tape 70 can be from 4 to 40 wires 55. The number of layers of tape 70 may equal the number of bead wires 55, however, this is not necessary and will depend on the tire application. Preferably, the cross-section of the bead 65 so formed is square, but it is understood that the cross-section of the bead 65 may be other shapes.

EXAMPLES

The following examples further illustrate and explain the invention. Unless otherwise indicated, quantities listed are parts by weight. The designations for SBR, such as SBR 1009A and SBR 4503, refer to material specification standards set by the American Polymer Institute. The designations for carbon black, such as N326 and N660, refer to the ASTM standards for carbon black. All measurements represent values considered significant in the industry, and, unless otherwise indicated, standard test conditions known to those skilled in the art were used. The meaning of other abbreviations are those known to those skilled in the art, and may be found in *The Vanderbilt Rubber Handbook*, published by R. T. Vanderbilt Company, Inc., Norwalk, Conn. and are hereby incorporated by reference. Amounts of ingredients used are parts by weight, unless otherwise indicated

Example 1

The bead insulation composition 60, D198, and the conventional bead insulation composition, ATG, were prepared according to the following formulas:

| Component | ATG | D198 |
|---|---|---|
| Natural Rubber | 15.00 | 0.00 |
| SBR 1500 | 85.00 | 0.00 |
| SBR 1712 | 0.00 | 38.00 |
| SBR 16% Bound Styrene | 0.00 | 42.00 |
| SBR 1009A | 0.00 | 20.00 |
| N326 | 0.00 | 53.00 |
| N660 | 95.00 | 51.30 |
| Oil | 24.00 | 0.00 |
| Tallow Fatty Acid | 1.5 | .85 |
| Wax | .50 | 0.00 |
| 6PPD | 0.00 | 0.85 |
| Zinc Oxide | 2.00 | 2.60 |
| Tackifying Resin | 0.50 | 11.50 |
| CRYSTEX ®-OT-20 | 0.00 | 6.25 |
| DCBS | 0.00 | 1.25 |
| MBTS | 0.80 | 0.00 |
| Sulfur | 20.00 | 0.00 |
| N-(Cyclohexylthio) phthalimide | 0.25 | 0.30 |

SBR 1009A is styrene butadiene rubber having a crosslinked, branched divinyl benzene, good dimensional stability in an uncured or green state, and 23.5% bound styrene. Polymer data for SBR 1009A is set forth below:

| DESCRIPTION | |
|---|---|
| Emulsifier: | Fatty Acid |
| Coagulant: | Salt Acid |
| Stabilizer: | Non-Staining, Non-Discoloring |
| Sp. Gr.: | 0.94 |
| CHEMICAL PROPERTIES | |
| Volatile Matter, % wt: | 0.75 max |
| Ash, % wt: | 1.50 max |
| Soap, % wt: | 0.50 max. |
| Bound Styrene, % wt: | 22.5-24.5 |
| Organic Acid, % wt: | 4.1-6.1 |
| PHYSICAL PROPERTIES | |
| CML 1 + 4 (100° C.) | 93-113 |
| Mill Shrinkage | 9-22% max |
| STRESS STRAIN | |
| 35' Tensile, minimum, psi | 1600 |
| MPa | 11.0 |
| 35' Elongation, minimum, % | 250 |
| 200% 35' Modulus, psi | 800 to 1400 |
| MPa | 5.5-9.7 |
| RHEOMETER (Monsanto ODR2000E) | |
| ML, lb$_f$*in | 12.9-18.9 |
| dN*m | 14.6-21.4 |
| MH, lb$_f$*in | 37.7-48.5 |
| dN*m | 42.6-54.8 |
| ts1, minutes | 0.2-4.2 |
| t'50, minutes | 6.1-10.1 |
| t'90, minutes | 11.6-16.6 |
| TEST RECIPE (ASTM 3185 2A) | | |
| Polymer | 100.00 | |
| Zinc Oxide | 3.00 | IRM 91A |
| Sulfur | 1.75 | NIST SRM 371 |
| Stearic Acid | 1.00 | NIST SRM 372 |
| Oil Furnace Black | 35.00 | IRB #6 |
| TBBS | 1.00 | NIST RM 8384 |

SBR 1712 is an uncrosslinked SBR rubber having 23.5% styrene, 76.5% butadiene and is oil-extended having a Mooney Viscosity, MML, of 46.0 and a specific gravity of 0.95. SBR 16% Bound Styrene is an uncross-linked SBR rubber having 16% styrene, 84% butadiene and oil-extended. It is understood that SBR 1712 may be used in place of SBR 16% Bound Styrene. While SBR 1009A, SBR 1712 and SBR 16% Bound Styrene are available from Ameripol Synpol Corporation, it is understood that any other styrene butadiene rubber having the above characteristics may be used.

The formulation of the composition according to D198 results in a bead rubber composition 60 having good dimensional stability in an uncured state and flow resistance, good processability, and excellent bead wire 55 adhesion.

Example 2

Tires 10 using uncured tire beads 65 made from D198, and precured tire beads 65 made from ATG, formulated as disclosed in Example 1 above, were manufactured and performance tested. The tires 10 using D198 performed equivalent to tires made with precured ATG tire beads 65.

Example 3

Figure 3:
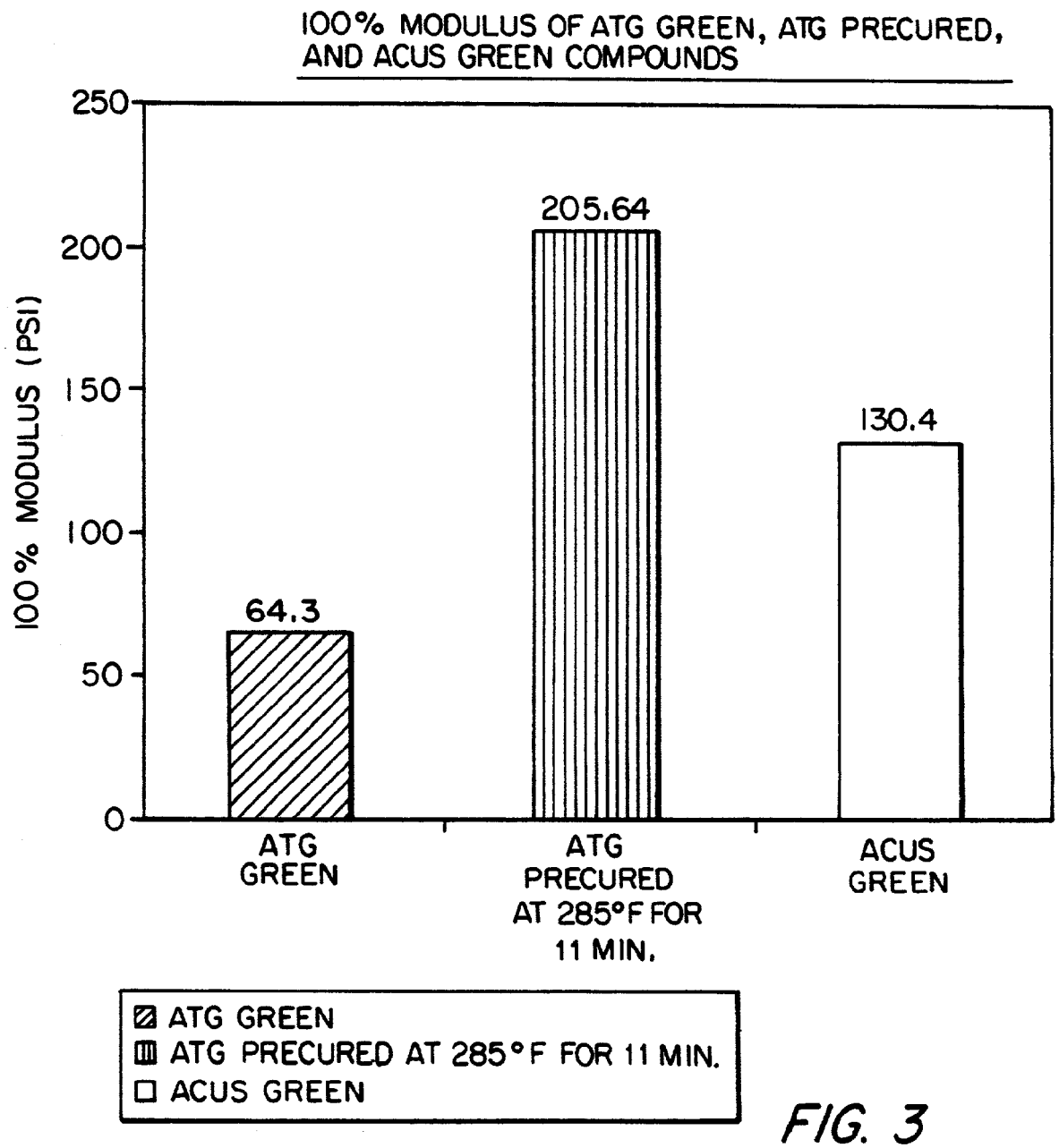
FIG. 3 is a comparison of the 100% modulus of bead insulation compositions.

The 100% modulus of bead rubber compositions 60, uncured ACUS (comparable to D198 and having the composition set forth in Example 8), and uncured ATG, formulated as disclosed in Example 1 above, was tested, and the results are shown in FIG. 3. It can be seen from FIG. 3 that the 100% modulus of ACUS is significantly higher than uncured bead rubber composition ATG, indicating superior dimensional stability of ACUS over the standard bead rubber composition. The scorch resistance of D198 and ACUS was between 20-22 minutes, which is considered excellent.

The standard test conditions for measuring bead rubber green strength are as follows:

Test Procedure for Rubber Green Strength

Sample Preparation

1. Mill rubber compound on a two roll mill into a sheet with a thickness of 0.100+/−0.01 inches.

2. As soon as the rubber sheet cools to room temperature, die cut 1"×6" specimens, in the direction of the mill grain.

Testing

3. Use an Instron Model 1122 Tester, or similar tension testing apparatus for testing.

4. Place the specimen in the grips of the testing machine, with a grip separation of one inch.

5. Use a rate of grip separation of 10.0+/−1.0 in./min.

6. The 100% modulus obtained from this testing is known as the green strength.

7. Repeat for five replicate specimens are required for testing.

8. The mean value of the five specimens is reported as the final result.

Example 4

The 100% modulus of uncured ACUS and precured ATG, each formulated according to the proportions set forth in Examples 8 and 1, respectively, was tested, and the results are shown in FIG. 3. It can be seen that the precured ATG has a higher 100% modulus than uncured ACUS, yet uncured ACUS has sufficient dimensional stability and excellent bead wire adhesion. Bead rubber composition ATG was precured at 285° F. for 11 minutes.

Example 5

Figure 4:
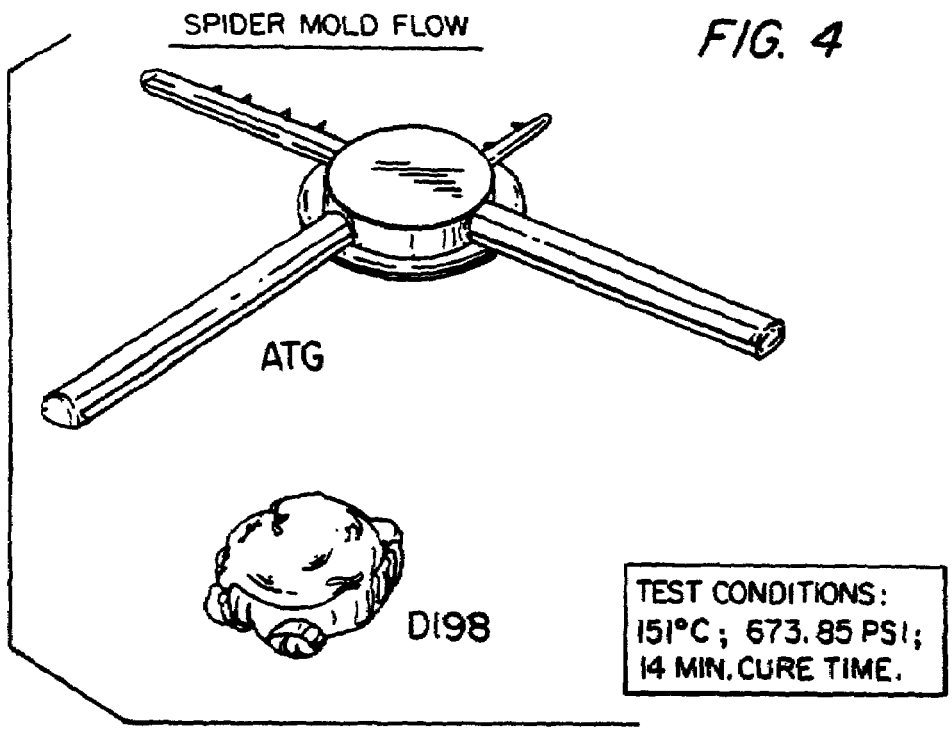
FIG. 4 is a comparison of Spider Mold Flow test results for bead insulation compositions.

The flow resistance of bead rubber compositions D198 and ATG, formulated as disclosed in Example 1 above, was tested, and the results are shown in FIG. 4. Spider Mold Flow results, at standard test conditions, for ATG and D198, as shown in FIG. 4, represent approximately 70-80% and 0%, respectively. It can be seen from FIG. 4 that D198 is more flow resistant than the conventional bead rubber composition, ATG, indicating that D198 has significantly better dimensionally stability than ATG.

Example 6

Figure 5:
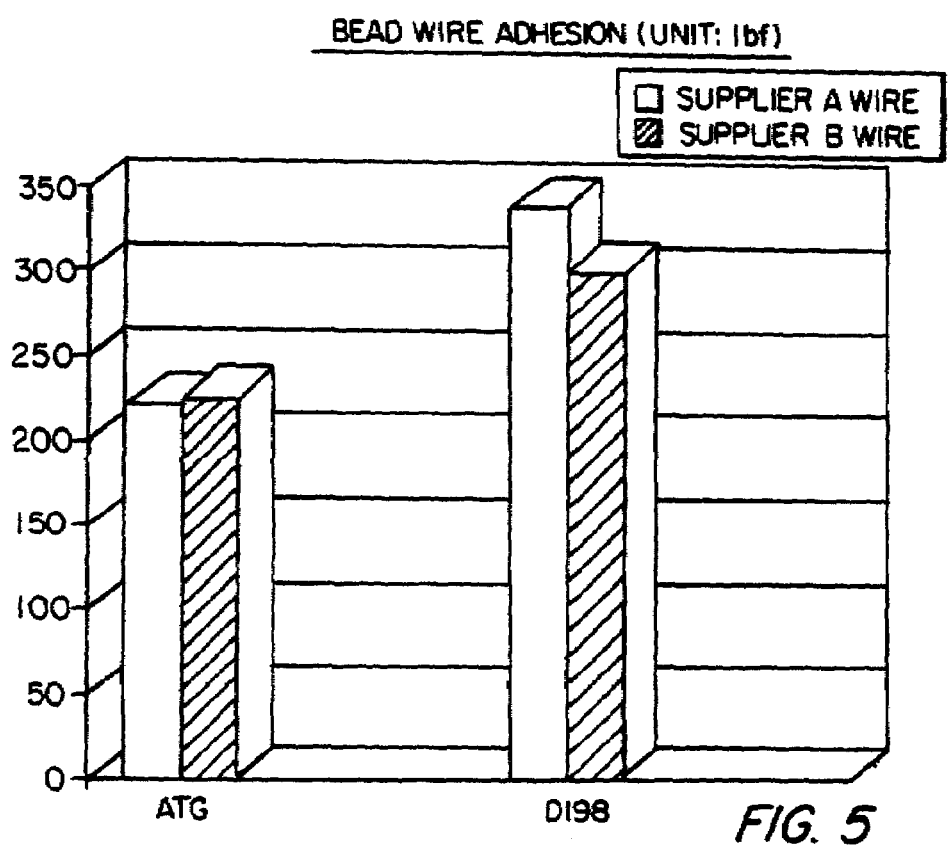
FIG. 5 is a comparison of Bead Wire Adhesion test results for bead insulation compositions.

The bead wire adhesion of bead rubber compositions D198 and ATG, as disclosed in Example 1 above, was tested pursuant to ASTM D187 and the results are shown in FIG. 5. It can be seen from FIG. 5 that D198 exhibits stronger bead wire adhesion, as compared to ATG bead rubber composition, using bead wire from two different suppliers, A and B, National Standard and Bekaert, respectively.

Example 7

Bead rubber composition 60 can be prepared according to the proportions set forth in Example 1 or Example 8, except that SBR 4503 can be substituted for SBR 1009A. SBR 4503 is a crosslinked styrene butadiene rubber having approximately 30% bound styrene, and is available from Ameripol Synpol Corporation. Polymer data for SBR 4503 is set forth below:

| DESCRIPTION | |
|---|---|
| Emulsifier: | Rosin Acid |
| Coagulant: | Salt Acid |
| Stabilizer: | Non-Staining, Non Discoloring |
| Sp. Gr. Typical: | 0.94 |
| CHEMICAL PROPERTIES (Tested per ASTM D1416) | |
| Volatile Matter, % wt: | 0.75 max |
| Ash, % wt: | 1.50 max |
| Soap, % wt: | 0.50 max. |
| Bound Styrene, % wt: | 28.5-31.5 |
| Organic Acid, % wt: | 3.4-7.4 |
| PHYSICAL PROPERTIES (ASTM Test Methods D1646, D412 and D2084) | |
| CVT cps + +(4% Solution Viscosity in Toluene) | 100-400 |
| Mill Shrinkage | 35% max |

The bead rubber composition 60 so formed is expected to exhibit excellent dimensional stability, high 100% modulus in an uncured state, good flow resistance and wire adhesion, and tires 10 made using a bead rubber composition 60 made with SBR 4503 are expected to perform as well as tires made using ATG bead rubber composition.

Example 8

Flow resistant bead rubber compositions 60 having good dimensional stability, processability and sufficient bead wire adhesion were prepared according to the following formulas:

| Component | D192 | D195 | D197 |
|---|---|---|---|
| SBR 1712 | 58.00 | 38.00 | 38.00 |
| SBR 16% Bound Styrene | 42.00 | 42.00 | 42.00 |
| SBR 1009A | 0.00 | 20.00 | 20.00 |
| N326 | 48.00 | 53.00 | 53.00 |
| N660 | 51.30 | 51.30 | 51.30 |
| Highly Aromatic Oil | 3.00 | 0.00 | 0.00 |
| Zinc Oxide | 2.60 | 2.60 | 2.60 |
| 6PPD | 0.85 | 0.85 | 0.85 |
| Tackifying Resin | 2.00 | 3.50 | 8.50 |
| Stearic Acid | 0.85 | 0.85 | 0.85 |
| CRYSTEX ®-OT-20 | 3.30 | 6.25 | 6.25 |
| TBBS | 0.90 | 0.00 | 0.00 |
| MBTS | 0.00 | 1.00 | 0.00 |
| DCBS | 0.00 | 0.00 | 1.25 |
| N-(Cyclohexylthio) phthalimide | 0.00 | 0.00 | 0.30 |
| ML 1 + 4 100° C. | 77.30 | 98.9 | 94.4 |
| Scorch (5 pt Rise), min. | 11.4 | 4.68 | 18.48 |
| Wire Adhesion | | | |
| National Standard Wire, lb$_f$ | 164.7 | 185.5 | 248.5 |
| Bekaert Wire, lb$_f$ | 125.6 | 191.8 | 291.3 |

The resulting bead rubber compositions 60 made according to the above formula had relatively low bead wire adhesion as compared to ACUS or D198, or bead wire adhesion which varied significantly, yet which is sufficient for some tire applications, but had good dimensional stability. Processability of the above formulations was acceptable, yet, while D197 had good scorch resistance, the scorch resistance of D192 and D195 was marginal.

Example 9

Additional flow resistant bead rubber compositions 60 having good dimensional stability, and processability and good bead wire adhesion were prepared according to the following formulas:

| Component | 73A | 73B | 73C |
|---|---|---|---|
| SBR 1500 | 80.00 | 80.00 | 80.00 |
| SBR 4503 | 20.00 | 20.00 | 20.00 |
| Zinc Oxide | 5.00 | 5.00 | 5.00 |
| N660 | 50.00 | 50.00 | 50.00 |

-continued

| Component | 73A | 73B | 73C |
|---|---|---|---|
| Aromatic Oil | 4.00 | 4.00 | 4.00 |
| Silane on Carbon | 2.00 | 2.00 | 2.00 |
| Silicone Dioxide | 15.00 | 15.00 | 15.00 |
| N660 | 45.00 | 45.00 | 45.00 |
| Aromatic Oil | 10.00 | 10.00 | 10.00 |
| Tackifying Resin | 3.00 | 3.00 | 3.00 |
| Stearic Acid | 3.00 | 3.00 | 3.00 |
| N660 | 30.00 | 30.00 | 30.00 |
| Aromatic Oil | 13.00 | 13.00 | 13.00 |
| N-(Cyclohexylthio)phthalimide | 0.51 | 0.51 | 0.51 |
| TMQ | 0.50 | 0.50 | 0.50 |
| CRYSTEX ®-OT-20 | 5.00 | 5.00 | 5.00 |
| TBBS | 1.25 | 0.00 | 0.00 |
| MBTS | 0.00 | 1.30 | 1.00 |
| Diphenylguanidine | 0.00 | 0.00 | 0.40 |
| ML 1 + 4 100° C. | 96.1 | 99.0 | 98.9 |
| Scorch @ 275° F., min. | | | |
| 2 pt Rise | 15.28 | 9.07 | 11.17 |
| 5 pt Rise | 19.33 | 14.60 | 13.48 |
| 10 pt Rise | 22.43 | 18.00 | 14.98 |
| Specific Gravity | 1.288 | 1.288 | 1.288 |
| IRHD Hardness (cured for 30' @ 151° C.) | 83.3 | 82.9 | 85.9 |
| Unaged Stress/Strain (cured for 30' @ 151° C.) | | | |
| M 100%, MPa | 11.39 | 8.60 | 11.41 |
| Tensile, MPa | 15.11 | 14.41 | 15.20 |
| $E_b$, % | 140 | 182 | 145 |
| MDR @ 151° C., min. | | | |
| $T_s2$ | 9.48 | 7.23 | 6.30 |
| T50 | 16.27 | 15.16 | 12.97 |
| T90 | 25.60 | 25.93 | 24.16 |
| $M_L$ | 3.81 | 3.65 | 3.42 |
| $M_H$ | 26.50 | 21.20 | 25.96 |
| Wire Adhesion (30' @ 151° C.) | | | |
| National Standard Wire, $lb_f$ | 276.9 | 220.5 | 219.0 |
| Bekaert Wire, $lb_f$ | 196.4 | 82.6 | 115.4 |
| Spider Mold Flow, % (151° C. @ 15 tons pressure) | 55.2 | 52.5 | 51.9 |

Bead rubber compositions 60 made according to the above formulas had relatively low and inconsistent bead wire adhesion, yet sufficient for some tire applications, but good dimensional stability. Processability of the above formulations was acceptable, yet, while 73A had good scorch resistance, the scorch resistance of 73B and 73C was marginal.

Example 10

A bead rubber composition was prepared according to the following formula:

| Component | ACUS |
|---|---|
| SBR 1712 | 38.00 |
| SBR 16% Bound Styrene | 42.00 |
| SBR 1009A | 20.00 |
| Zinc Oxide | 2.60 |
| N326 | 53.00 |
| Stearic Acid | 0.85 |
| N660 | 31.50 |
| Aromatic Oil | 9.75 |

-continued

| Component | ACUS |
|---|---|
| Tackifier Resin | 3.75 |
| TMQ | 0.85 |
| CRYSTEX ®-OT-20 | 6.25 |
| DCBS | 1.25 |
| N-(Cyclohexylthio)phthalimide | 0.20 |

The first five ingredients were mixed in an intermixer for a total of approximately 253 seconds. The next four ingredients were mixed in the intermixer with the mixture containing the first five ingredients for approximately 247 seconds. This mixture was further mixed in a Banbury mixer for approximately 119 seconds. The final ingredients were then added to the mixture and mixed further in a Banbury mixer for approximately 182 seconds.

Tire beads 65 were prepared using the tire bead compositions in conventional bead forming equipment The physical properties of the resulting bead rubber composition 60 and tire beads 65 were as follows:

| | |
|---|---|
| Mooney Viscosity, ML 1 + 4 @ 212° F., after 8 hours aging | 85-90 |
| Scorch, MS @ 275° F., min. | 18-24 |
| Durometer, Shore A, 4 min. @ 365° F. | 74-83 |
| Durometer, IRHD, 30 min. @ 304° F. | 76-85 |
| 50% Modulus, 30 min. @ 304° F., psi | 3.00-4.60 |
| 100% Modulus, 30 min. @ 304° F., psi | 6.19-9.52 |
| Tensile, 30 min. @ 304° F., min. | 10.0 |
| Elongation, 30 min. @ 304° F., min. | 142 |
| Adhesion, $lb_f$ | >70 |
| Dispersion | >6 |

It is preferred that the Mooney Viscosity be from about 85 to about 90 for successful bead formation.

The bead rubber composition 60 had excellent dimensional stability, flow resistance, processability and bead wire 55 adhesion, and tires 10 made using an unprocessed bead 65 made with the above bead rubber composition 60 performed well in comparison with conventional beads made using conventional bead rubber compositions.

Example 11

A tire bead 65 was prepared using the bead rubber compositions 60 set forth in any of the examples above, and having the following number of layers of tape 70 and bead wires 55:

| Number of Wires | Number of Layers |
|---|---|
| 4 | 4 |
| 4 | 5 |
| 5 | 5 |
| 6 | 5 |
| 7 | 6 |

Tires 10 made with the above bead construction performed well.

Although the invention has been described with reference to particular ingredients and formulations and the like, these are not intended to exhaust all possible arrangements or features, and indeed many other modifications and variations will be ascertainable to those of skill in the art.

We claim:

1. A tire, comprising:
   a tire carcass having two opposite ends; and
   a dimensionally stable bead disposed over each end of said tire carcass, each of said dimensionally stable beads comprising a tape formed by a plurality of wires encapsulated and adhered by a rubber composition, the rubber in said rubber composition including:
   a styrene butadiene rubber having a crosslinked styrene butadiene; and
   a non-crosslinked styrene butadiene rubber.

2. A tire according to claim 1, wherein each dimensionally stable bead comprises from about 4 to about 40 layers of bead wire tape.

3. A tire according to claim 1, wherein a number of layers of bead wire tape equals a number of bead wires in a cross section of the bead wire tape.

4. A tire according to claim 1, wherein each dimensionally stable bead comprises a square cross-section.

5. A tire according to claim 1, wherein the bead wire tape comprises from about 4 to 40 bead wires in a cross-section of the bead wire tape.

6. A tire according to claim 1, wherein the rubber composition further comprises a cure package containing sulfur and N,N'-dicyclohexyl-2-benzothiazole-sulfenamide (DCBS) or N-tert-butyl-2-benzothiazolesulfenemide (TBBS).

7. A tire according to claim 1, wherein the rubber composition comprises at least about 16% bound styrene.

8. A tire according to claim 1, wherein the rubber composition comprises an average compound raw Mooney Viscosity at 100° C. after 8 hours of aging of at least about 85.

9. A tire according to claim 1, wherein the rubber composition comprises about 10 to about 70 parts crosslinked styrene butadiene rubber per 100 parts rubber.

* * * * *